United States Patent
Tsai et al.

(10) Patent No.: US 7,728,939 B2
(45) Date of Patent: Jun. 1, 2010

(54) MULTI-DOMAIN LIQUID CRYSTAL DISPLAY

(75) Inventors: Ying-Cheng Tsai, Pu Tai Town (TW); Chien-Ting Chan, Chang Hua County (TW); Hsi-Rong Han, Tai Chung County (TW); Wen-Chun Wang, Tai Chung (TW)

(73) Assignee: Wintek Corporation, Taichung (TW)

( * ) Notice: Subject to any disclaimer, the term of this patent is extended or adjusted under 35 U.S.C. 154(b) by 547 days.

(21) Appl. No.: 11/717,728

(22) Filed: Mar. 14, 2007

(65) Prior Publication Data

US 2008/0018814 A1 Jan. 24, 2008

(51) Int. Cl.
*G02F 1/1337* (2006.01)

(52) U.S. Cl. ........................ 349/129; 349/144
(58) Field of Classification Search ............... 349/129, 349/144
See application file for complete search history.

(56) References Cited

U.S. PATENT DOCUMENTS

| | | |
|---|---|---|
| 5,309,264 A | 5/1994 | Lien et al. |
| 6,115,089 A | 9/2000 | Hayashi |
| 6,256,076 B1 | 7/2001 | Bae et al. |
| 6,262,784 B1 | 7/2001 | Kim |
| 6,404,465 B1 | 6/2002 | Nakayama et al. |
| 6,421,102 B2 | 7/2002 | Nakayama et al. |
| 6,545,730 B1 | 4/2003 | Hwang |
| 6,580,473 B2 | 6/2003 | Kim |
| 6,791,630 B2 | 9/2004 | Kim |
| 2003/0107687 A1* | 6/2003 | Choo et al. ............ 349/39 |
| 2005/0046774 A1* | 3/2005 | Choi et al. ............ 349/139 |

\* cited by examiner

*Primary Examiner*—Richard H Kim
(74) *Attorney, Agent, or Firm*—Muncy, Geissler, Olds & Lowe, PLLC

(57) ABSTRACT

A multi-domain liquid crystal display includes a plurality of first and second picture elements having polarities opposite to each other under the same frame of an inversion drive scheme. Each first picture element has an extension part positioned next to at least one side of the adjacent second picture element, and each second picture element has an extension part positioned next to at least one side of the adjacent first picture element.

6 Claims, 11 Drawing Sheets

|     | Frame N column |   |   |   |   |
|-----|---|---|---|---|---|
|     | 1 | 2 | 3 | 4 | 5 |
| row 1 | + | − | + | − | + |
| row 2 | + | − | + | − | + |
| row 3 | + | − | + | − | + |
| row 4 | + | − | + | − | + |
| row 5 | + | − | + | − | + |

|     | Frame N+1 column |   |   |   |   |
|-----|---|---|---|---|---|
|     | 1 | 2 | 3 | 4 | 5 |
| row 1 | − | + | − | + | − |
| row 2 | − | + | − | + | − |
| row 3 | − | + | − | + | − |
| row 4 | − | + | − | + | − |
| row 5 | − | + | − | + | − |

FIG. 4A

|     | Frame N column |   |   |   |   |
|-----|---|---|---|---|---|
|     | 1 | 2 | 3 | 4 | 5 |
| row 1 | + | + | + | + | + |
| row 2 | − | − | − | − | − |
| row 3 | + | + | + | + | + |
| row 4 | − | − | − | − | − |
| row 5 | + | + | + | + | + |

|     | Frame N+1 column |   |   |   |   |
|-----|---|---|---|---|---|
|     | 1 | 2 | 3 | 4 | 5 |
| row 1 | − | − | − | − | − |
| row 2 | + | + | + | + | + |
| row 3 | − | − | − | − | − |
| row 4 | + | + | + | + | + |
| row 5 | − | − | − | − | − |

FIG. 4B

MULTI-DOMAIN LIQUID CRYSTAL DISPLAY

BACKGROUND OF THE INVENTION (a) Field of the Invention

The invention relates to a multi-domain liquid crystal display having a high aperture ratio.

(b) Description of the Related Art

Typically, the display contrast ratio and response speed offered by a VA (vertically-aligned) mode liquid crystal display, which uses negative liquid crystal materials and vertical alignment films, are better than a TN (twisted-nematic) mode LCD, since liquid crystal molecules are aligned in a vertical direction when no voltage is applied. Also, it is known the viewing angle performance of a VA mode LCD is improved by setting the orientation directions of the liquid crystal molecules inside each picture element to a plurality of mutually different directions; that is, forming multiple distinct domains in the liquid crystal display.

FIG. 1A shows a schematic diagram illustrating a conventional design of a multi-domain vertically aligned liquid crystal display (MVA LCD). Referring to FIG. 1A, a top substrate 102 and a bottom substrate 104 are both provided with protrusions 106 having different inclined surfaces and covered by vertical alignment films 108. Hence, the liquid crystal molecules 112 near the inclined surfaces orientate vertically to the inclined surfaces to have different degrees of pre-tilt angles. In case the pre-tilt liquid crystal molecules exist, surrounding liquid crystal molecules 112 are tilted in the directions of the pre-tilt liquid crystal molecules 112 when a voltage is applied. Thus, multiple domains each having individual orientation direction of liquid crystal molecules 112 are formed. Besides, the domain-regulating structure for providing inclined surfaces includes, but is not limited to, the protrusions 106, and other structure such as a via structure 114 shown in FIG. 1B may also be used.

However, when one compares the optical path of light l1 and that of light l2 shown both in FIGS. 1A and 1B, it is clearly found the tilted liquid crystal molecules through which the light l2 passes under a field-off state may result in a non-zero phase difference ($\Box$nd$\neq$0) to cause light leakage. Accordingly, additional compensation films must be provided to eliminate the light leakage.

FIG. 2 shows a schematic diagram illustrating another conventional design of an MVA LCD. Referring to FIG. 2, the transparent electrode 204 on the substrate 202 is provided with slits 206. Because of the fringe fields produced at edges of transparent electrode 204 and at each slit 206, the liquid crystal molecules 208 are tilted toward the center of each slit 206 to result in a multi-domain liquid crystal (LC) cell. However, the strength of the fringe fields generated by the formation of the slits 206 is often insufficient, particularly when the widths and the intervals of the slits 206 are not optimized. Besides, since the azimuth in which the liquid crystal molecules tilt due to fringe fields includes all directions of 360 degrees, a disclination region 210 often appears beyond the slits 206 or between two adjacent slits 206 to result in a reduced light transmittance.

Further, though the protrusion 106, via structure 114, or slit 206 may be provided to create multiple domains, the distribution of these structures in a picture element may reduce the active display area and thus the aperture ratio of the picture element.

BRIEF SUMMARY OF THE INVENTION

Hence, an object of the invention is to provide a multi-domain liquid crystal display capable of solving the problems of conventional designs and providing a high pixel aperture ratio.

According to the invention, the multi-domain liquid crystal display includes a plurality of first and second picture elements having polarities opposite to each other under the same frame of an inversion drive scheme. Each first picture element has an extension part positioned next to at least one side of the adjacent second picture element, and each second picture element has an extension part positioned next to at least one side of the adjacent first picture element. Further, the extension parts of the picture element provided in an inter-pixel region function as storage capacitors, and the position of the storage capacitors overlap that of scan lines or data lines.

Through the design of the invention, since a multi-domain profile of a LC cell is easily formed by providing at least one extension part of a pixel electrode, which is formed through typical TFT fabrication processes and extends to an inter-pixel region between two adjacent picture elements to produce fringe fields. Hence, compared with the conventional design where a protrusion or via structure is used to cause tilted liquid crystal molecules, the residue phase difference is eliminated to avoid light leakage according to the invention since all liquid crystal molecules are vertically aligned under a field-off state. Further, compared with another conventional design where slits are formed to produce fringe fields, the biased extension part of each pixel electrode allows for stronger field strength to tilt liquid crystal molecules so as to reduce the areas of a disclination region and thus increase the light-transmittance of an LCD. In addition, since the common lines are positioned overlapping the data lines according to the invention, the storage capacitor provided in a picture element is thus placed in the inter-pixel region that already spreads with opaque metallic scans lines or data lines to further improved the pixel aperture ratio.

BRIEF DESCRIPTION OF THE DRAWINGS

FIGS. 4A and 4B show schematic diagrams respectively illustrating a column inversion and a row inversion polarity patterns of a liquid crystal display under a polarity inversion drive scheme.

FIG. 5A is a top view observed from the normal direction of an array substrate, and FIG. 5B is a cross-section taken along line A-A' in FIG. 5A.

DETAILED DESCRIPTION OF THE INVENTION

Figure 1A:
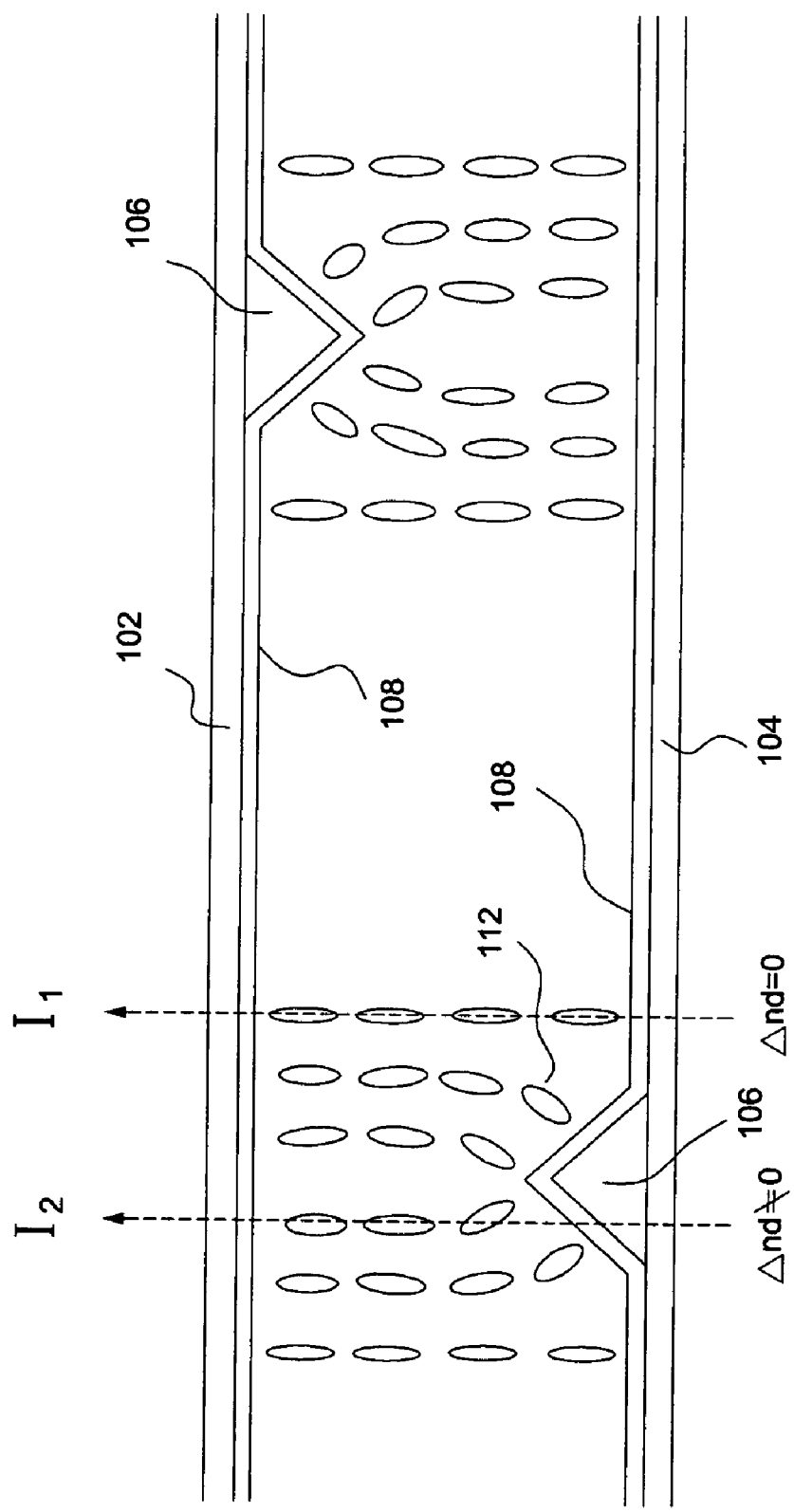
FIG. 1A shows a schematic diagram illustrating a conventional design of a multi-domain vertically aligned liquid crystal display.
Figure 1B:
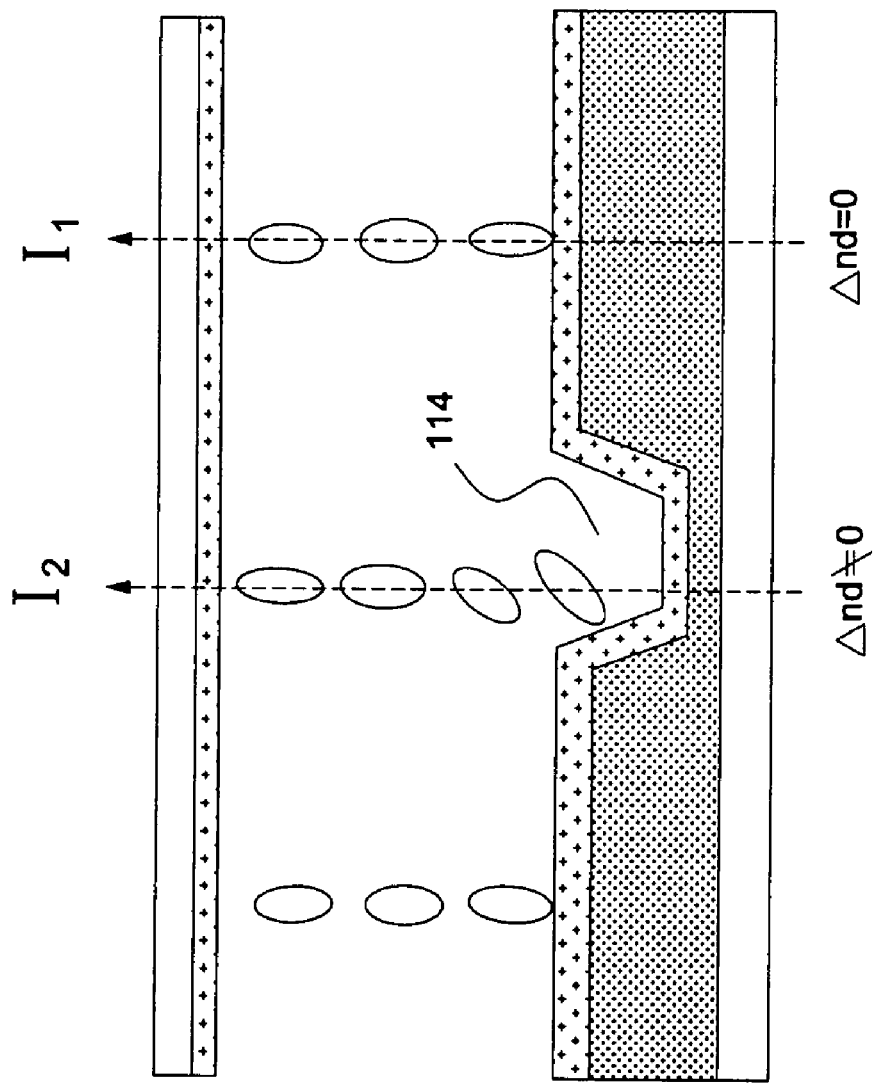
FIG. 1B shows a schematic diagram illustrating another conventional design of a multi-domain vertically aligned liquid crystal display.
Figure 2:
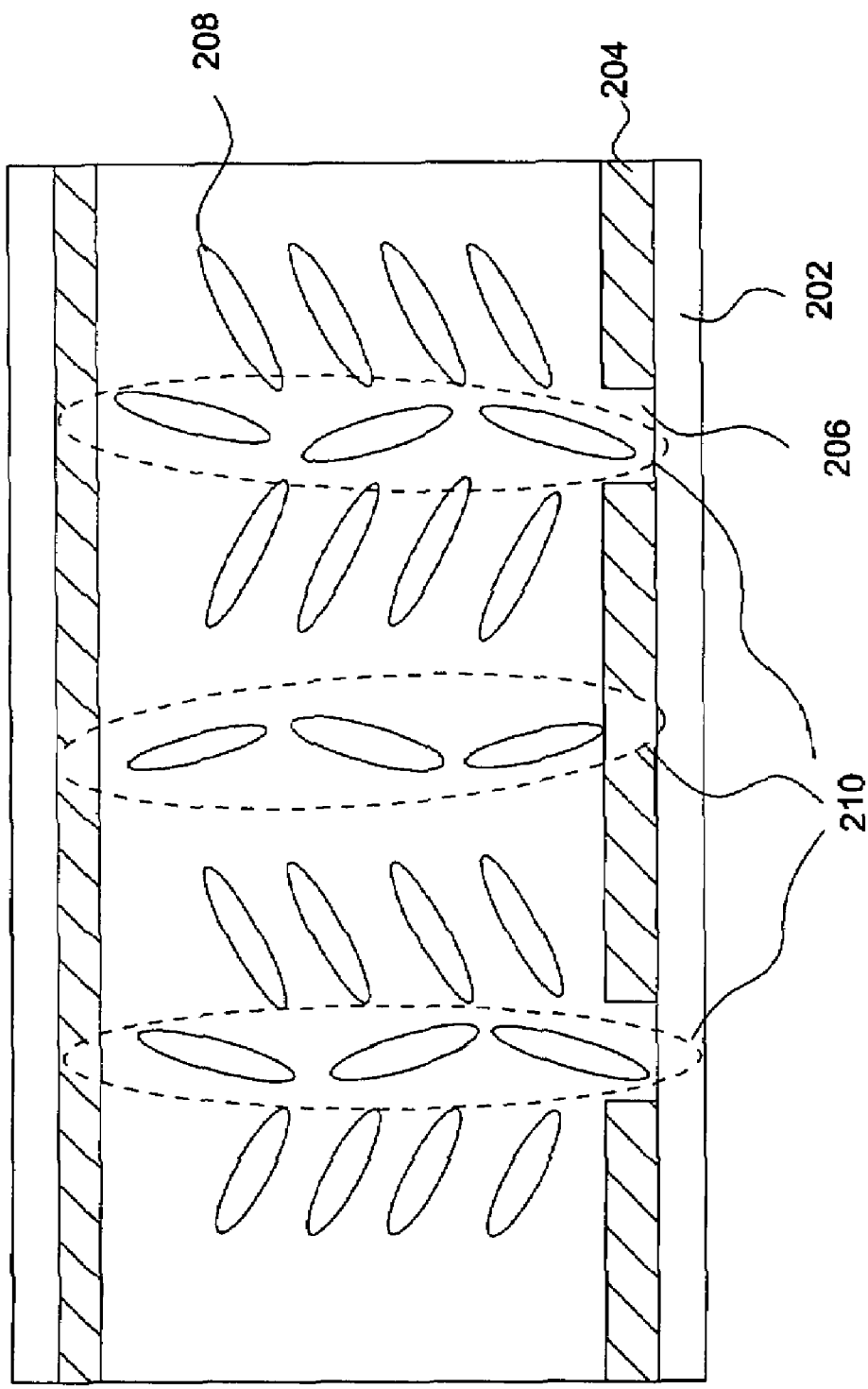
FIG. 2 shows a schematic diagram illustrating another conventional design of a multi-domain vertically aligned liquid crystal display.
Figure 3:
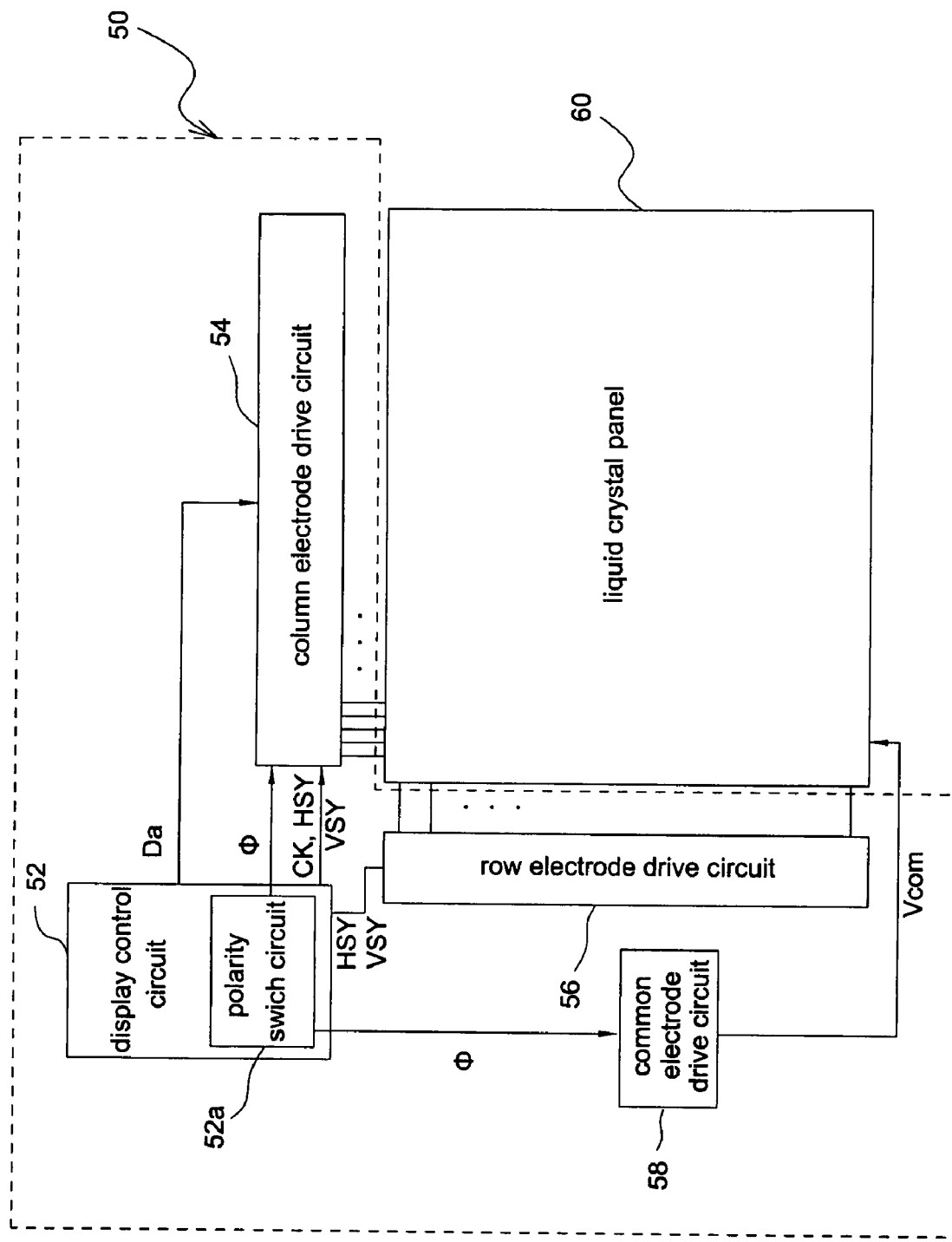
FIG. 3 shows a schematic diagram illustrating a drive circuitry for a polarity inversion control in a liquid crystal display.

FIG. 3 shows a schematic diagram illustrating a drive circuitry 50 for a polarity inversion control in a liquid crystal display. Referring to FIG. 3, a display control circuit 52 generates display clock signals CK, horizontal synchronizing signals HSY, vertical synchronizing signals VSY and digital image data Da, which are supplied to a column electrode drive circuit 54 and a row electrode drive circuit 56. Also, the drive circuitry 50 includes a polarity switch circuit 52a that inverts polarities of data signals (i.e., positive-negative polarity of the electric voltage to be applied to the liquid crystal panel 60) through a polarity control signals D according to the horizontal synchronizing signals HSY and the vertical synchronizing signals VSY. Further, a common electrode drive circuit 58 provides the common electrode of the liquid crystal panel 60 with a common voltage Vcom. FIGS. 4A and 4B show schematic diagrams respectively illustrating a column inversion and a row inversion polarity patterns of a liquid crystal display under a polarity inversion drive scheme. It can be seen positive-polarity picture elements and negative-polarity picture elements alternate with each other in the horizontal direction (row direction) or in the vertical direction (column direction) under the same frame of the polarity inversion drive scheme.

Figure 5A:
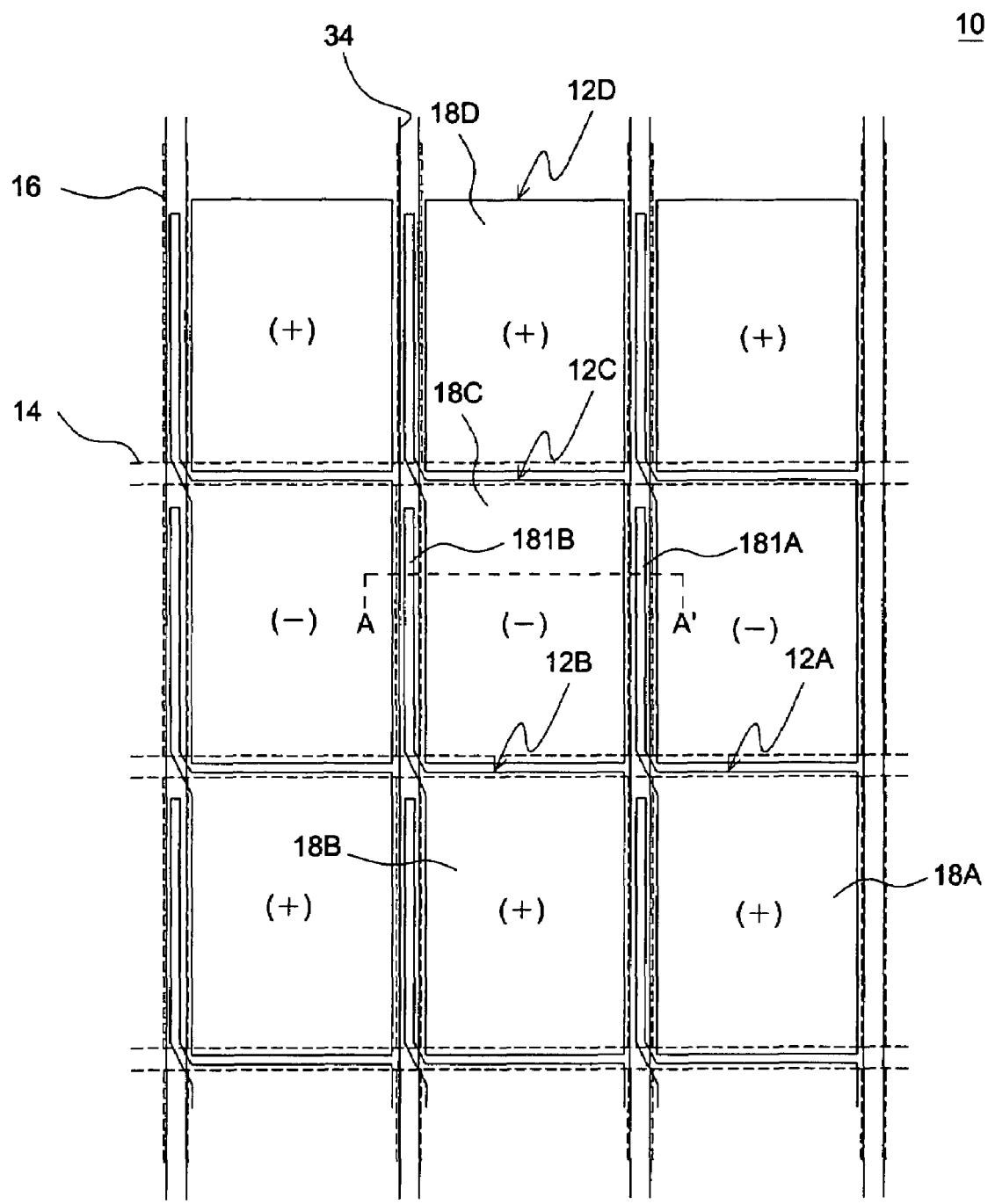
FIGS. 5A and 5B show schematic diagrams illustrating a multi-domain liquid crystal display according to an embodiment of the invention, where
Figure 5B:
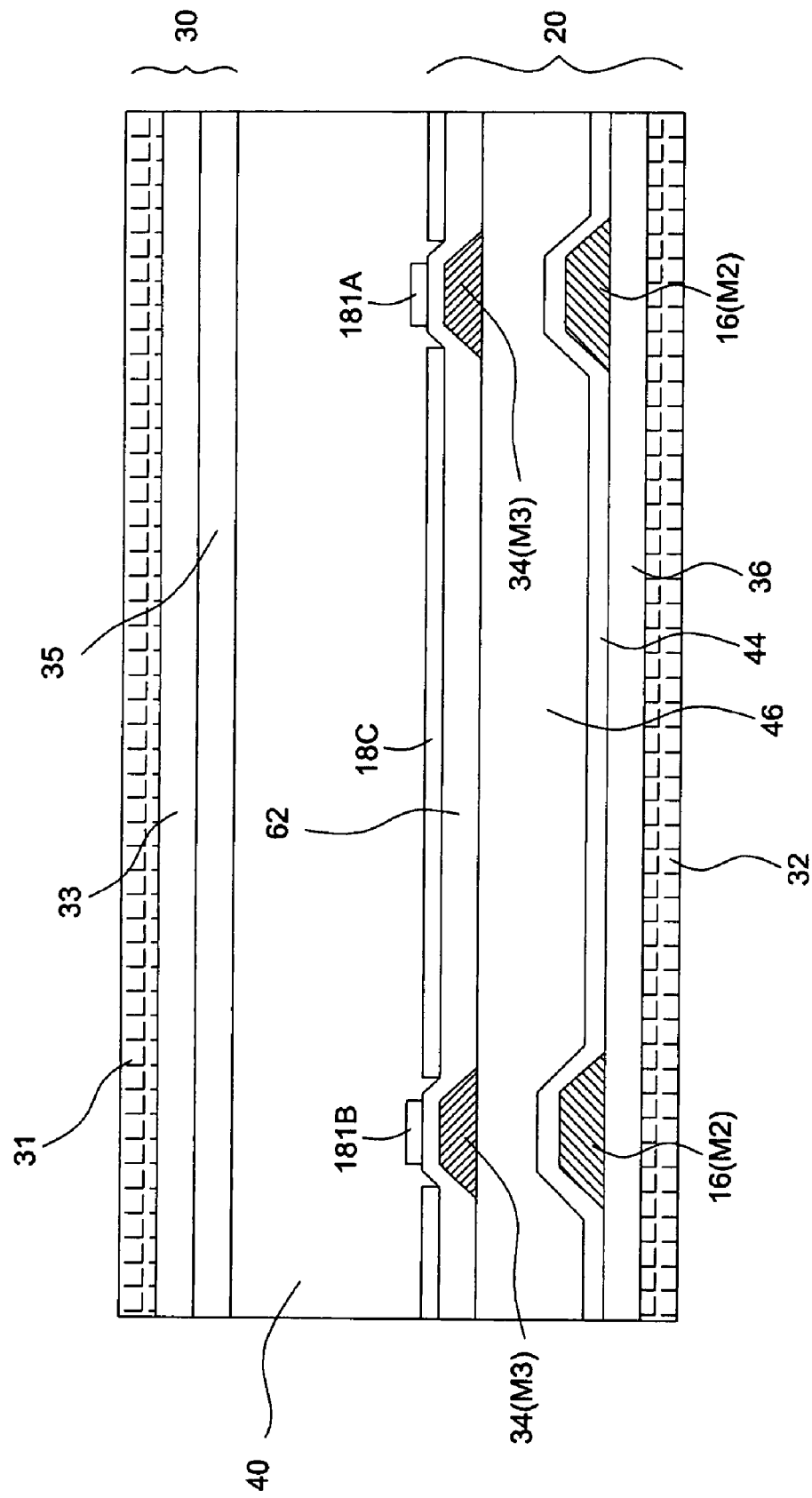

FIGS. 5A and 5B show schematic diagrams illustrating a multi-domain liquid crystal display 10 according to an embodiment of the invention, where FIG. 5A is a top view observed from the normal direction of an array substrate, and FIG. 5B is a cross-section taken along line A-A' in FIG. 5A.

Referring to FIG. 5A, a plurality of picture elements that constitute the multi-domain liquid crystal display 10 are shown. Herein, the term "picture element" indicates an individual addressable display unit such as a red (R), green (G), or blue (B) sub-pixel of a color liquid crystal display. A plurality of scan lines 14 are arranged extending in the horizontal direction, and a plurality of data lines 16 are arranged extending in a vertical direction, with each two scan lines 14 intersected with two data lines 16 to define a block area on which a picture element is spread. Each picture element is surrounded by an inter-pixel region that insulates adjacent picture elements from each other. Further, according to this embodiment, each picture element has an extension part that extends to the inter-pixel region to cause each picture element to have multiple liquid crystal (LC) domains.

The design of the invention is described below by taking four picture elements 12A, 12B, 12C and 12D as an example. Each picture element includes a pixel electrode 18A, 18B, 18C or 18D spread on the block area defined by two scan lines 14 and two data lines 16. FIG. 5A also illustrates a polarity pattern under the same frame of a polarity inversion drive scheme, where the symbol (+) indicates a positive-polarity picture element and the symbol (–) indicates a negative-polarity picture element.

As shown in FIG. 5A, under a row-inversion drive scheme, the pixel electrodes 18A and 18B in one row have a positive polarity and the pixel electrode 18C in the adjacent row has a negative polarity. The pixel electrode 18A has an extension part 181A that extends to an inter-pixel region on the right side of the pixel electrode 18C, and the pixel electrode 18B has an extension part 181B that extends to an inter-pixel region on the left side of the pixel electrode 18C. Hence, a voltage difference exists between the pixel electrode 18C with a negative polarity and the surrounding extension parts 181A and 181B with a positive polarity to produce fringe fields, and the liquid crystal molecules with negative dielectric anisotropy are directed to a direction perpendicular to the slant electric filed. Under the circumstance, the orientations of liquid crystal molecules within one picture element are divided into different tilt directions. Besides, since the voltage differences also exist between the pixel electrode 18C (negative polarity) and the pixel electrode 18D (positive polarity) over it and between the pixel electrode 18C (negative polarity) and the pixel electrode 18B (positive polarity) under it to produce fringe fields, the resultant effect may create a four-domain profile of an LC cell.

Next, as shown in FIG. 5B, the multi-domain liquid crystal display 10 includes an array substrate 20, a color filter substrate 30, and a liquid crystal layer 40 with a negative dielectric anisotropy interposed between them. The liquid crystal molecules in the liquid crystal layer 40 are vertically aligned without being applied with a voltage. Further, an additive of chiral dopant may be added to the liquid crystal layer 40 to adjust the twist pitch to a desired value so as to reduce the area of a disclination region. In the color filter substrate 30, a color filter 33 and a common electrode 35 are formed on a transparent substrate 31. In the array substrate 20, a metal 1 layer M1 (not shown) is deposited on the transparent substrate 32 and patterned to define the scan lines 14. A dielectric gate insulation layer 36 is formed on the transparent substrate 32 and covers the metal 1 layer M1. A metal 2 layer M2 is deposited on the gate insulation layer 36 and patterned to define the data lines 16. A dielectric passivation layer 44 and a flattened layer 46 are sequentially formed on the gate insulation layer 36 and cover the data lines 16. A metal 3 layer M3 is deposited on the flattened layer 46 and patterned to define common lines 34 that are electrically connected to the common electrode 35. A dielectric layer 62 is formed on the flattened layer 46 and covers the common lines 34, and each pixel electrode with at least one extension part is formed on the dielectric layer 62. For example, the extension parts 181A and 181B with positive polarity that respectively protrude from two adjacent pixel electrodes 18A and 18B are positioned next to the right side and the left side of the pixel electrode 18C to produce fringe fields.

In this embodiment, the common lines 34 overlap the extension parts of pixel electrodes (such as extension parts 181A and 181B) and are insulated from each other by the dielectric layer 62 to form storage capacitors. Besides, the common lines 34 are positioned overlapping the data lines 16 to further improve the pixel aperture ratio.

According to this embodiment, a multi-domain profile of a LC cell is easily formed by providing at least one extension part of a pixel electrode, which is formed through typical TFT fabrication processes and extends to an inter-pixel region between two adjacent picture elements to produce fringe fields. Hence, compared with the conventional design where a protrusion or via structure is used to cause tilted liquid crystal molecules, the residue phase difference is eliminated to avoid light leakage according to this embodiment since all liquid crystal molecules are vertically aligned under a field-off state. Further, compared with another conventional design where slits are formed to produce fringe fields, the biased extension part of each pixel electrode allows for stronger field strength to tilt liquid crystal molecules so as to reduce the areas of a disclination region and thus increase the light-transmittance of an LCD. In addition, since the common lines 34 are positioned overlapping the data lines 16 according to this embodiment, the storage capacitor provided in a picture element is thus placed in the inter-pixel region that already spreads with opaque metallic scans lines 14 or data lines 16 to further improved the pixel aperture ratio.

Figure 6:
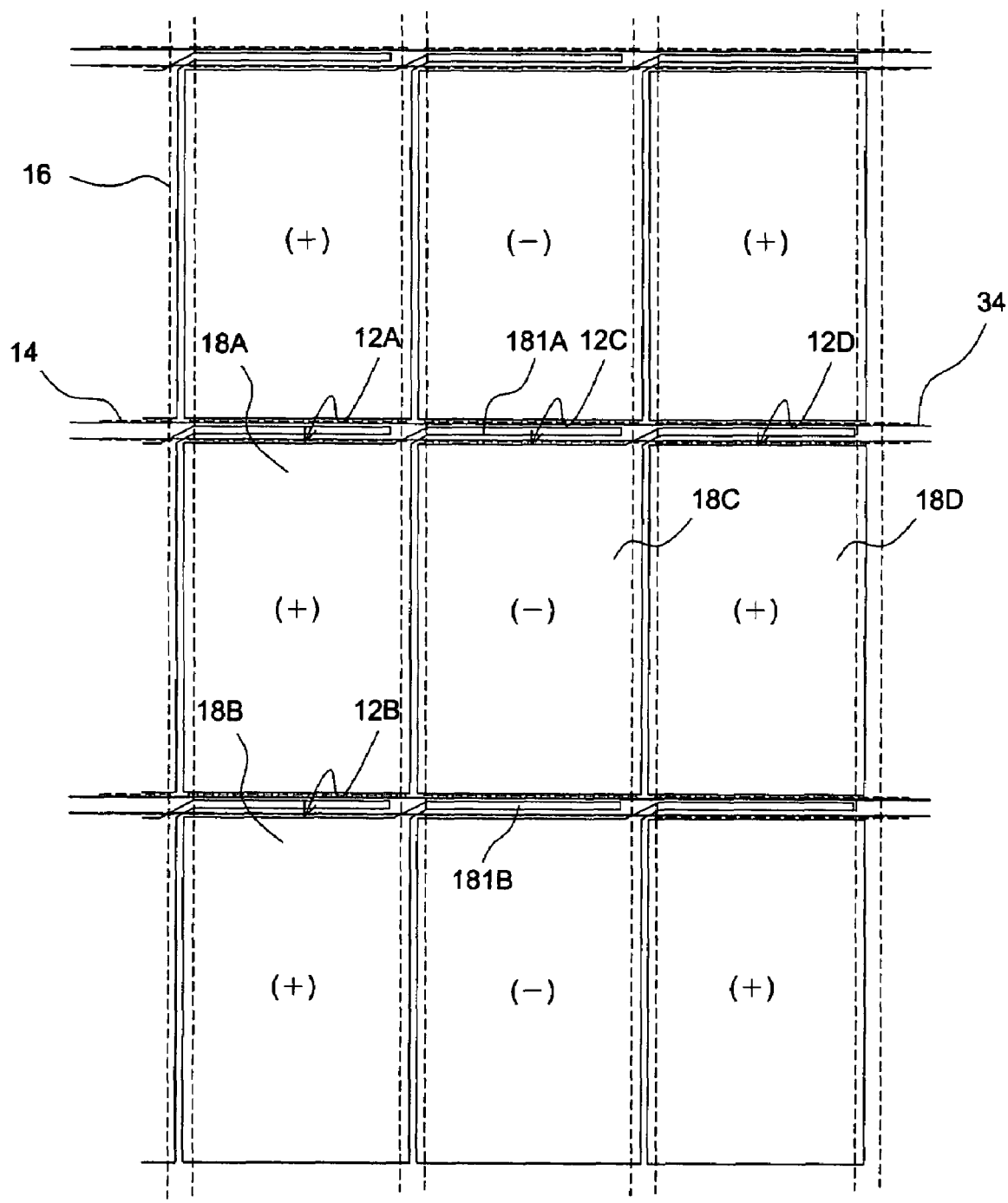
FIG. 6 shows a schematic diagram illustrating a multi-domain liquid crystal display and a column inversion polarity pattern according to another embodiment of the invention.

FIG. 6 shows a schematic diagram illustrating a multi-domain liquid crystal display 70 and a column inversion polarity pattern according to another embodiment of the invention. As shown in FIG. 6, under a column inversion drive scheme, the pixel electrodes 18A and 18B in one column have a positive polarity, and the pixel electrode 18C in the adjacent column has a negative polarity. The pixel electrode 18A has an extension part 181A extending to an inter-pixel region on the top side of the pixel electrode 18C, and the pixel electrode 18B has an extension part 181B extending to an inter-pixel region on the bottom side of the pixel electrode 18C. Hence, a voltage difference exists between the pixel electrode 18C with a negative polarity and the surrounding extension parts 181A and 181B with a positive polarity to produce fringe fields. Also, the common lines 34 together with the extension parts of pixel electrodes (such as extension parts 181A and 181B) form storage capacitors, and the common lines 34 are positioned overlapping the scan lines 14 to further improve the pixel aperture ratio.

Figure 7:
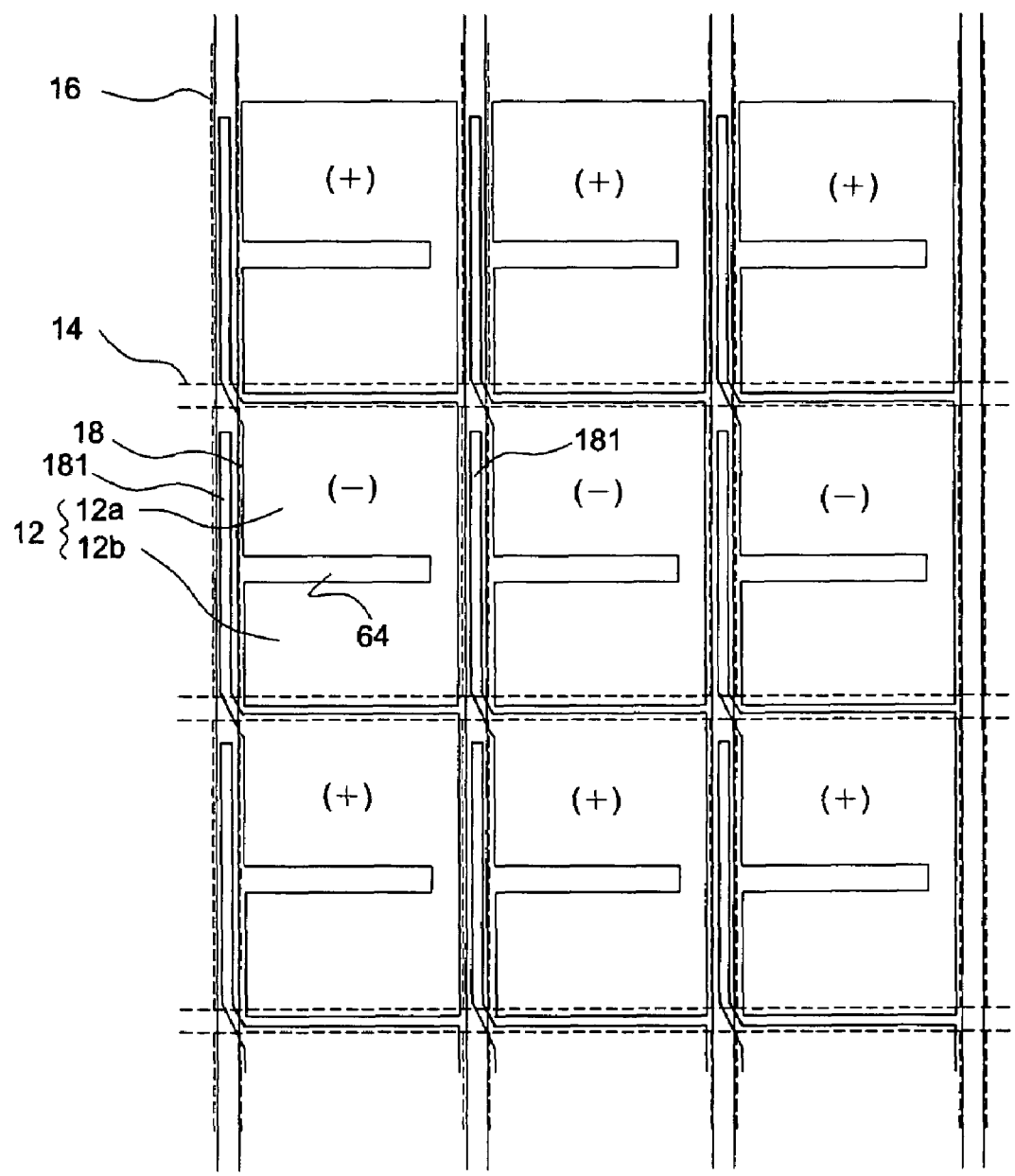
FIG. 7 shows a schematic diagram illustrating a multi-domain liquid crystal display according to another embodiment of the invention.

FIG. 7 shows a schematic diagram illustrating a multi-domain liquid crystal display 80 according to another embodiment of the invention. In this embodiment, each pixel electrode 18 is divided into multiple sections by means of at least one slit 64 to separate a picture element into a plurality of sub picture elements each having multiple distinct LC domains, such as two sub picture elements 12a and 12b shown in FIG. 7. Since the silt 64 may induce fringe fields therein as well as at pixel electrode edges, the silt 64 and part of the extension part 181 that surround a sub picture element 12a or 12b cause the sub picture element to have multiple distinct LC domains.

Figure 8:
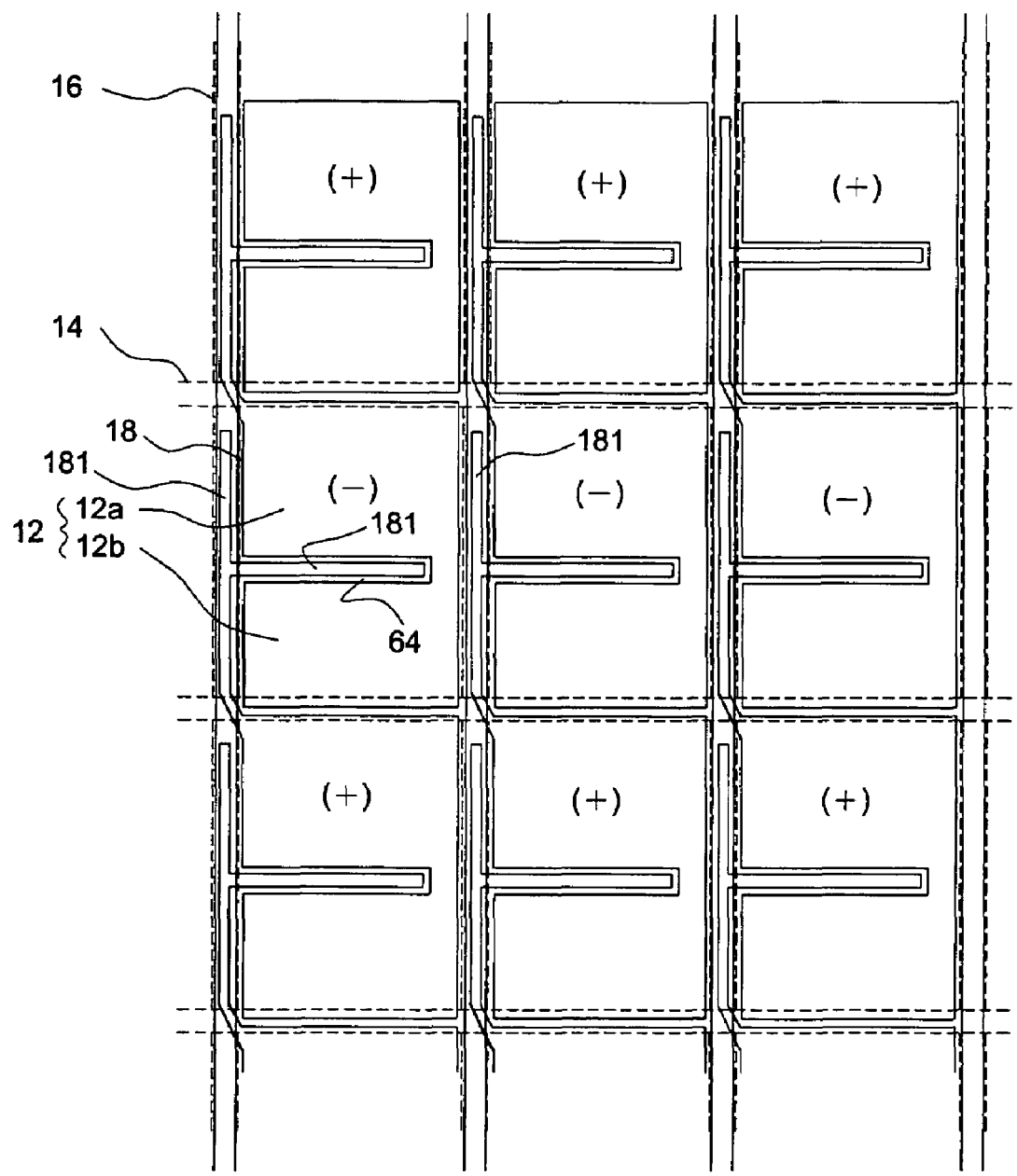
FIG. 8 shows a schematic diagram illustrating a multi-domain liquid crystal display according to another embodiment of the invention.

FIG. 8 shows a schematic diagram illustrating a multi-domain liquid crystal display 90 according to another embodiment of the invention. In this embodiment, the extension part 181 has a branch extending into the slit 64 to further enhance the field strength to tilt liquid crystal molecules. Though in the above embodiments each picture element 12 is divided into two sub picture element 12a and 12b, this division is not limited. Since the response time of liquid crystal molecules is reduced as the number of sub pixel elements is increased, the manner of division can be arbitrarily selected according to the actual demand. Further, the distribution of the extension parts 181 and the slits 64 is not limited as well as sufficient field strength is provided.

Figure 9:
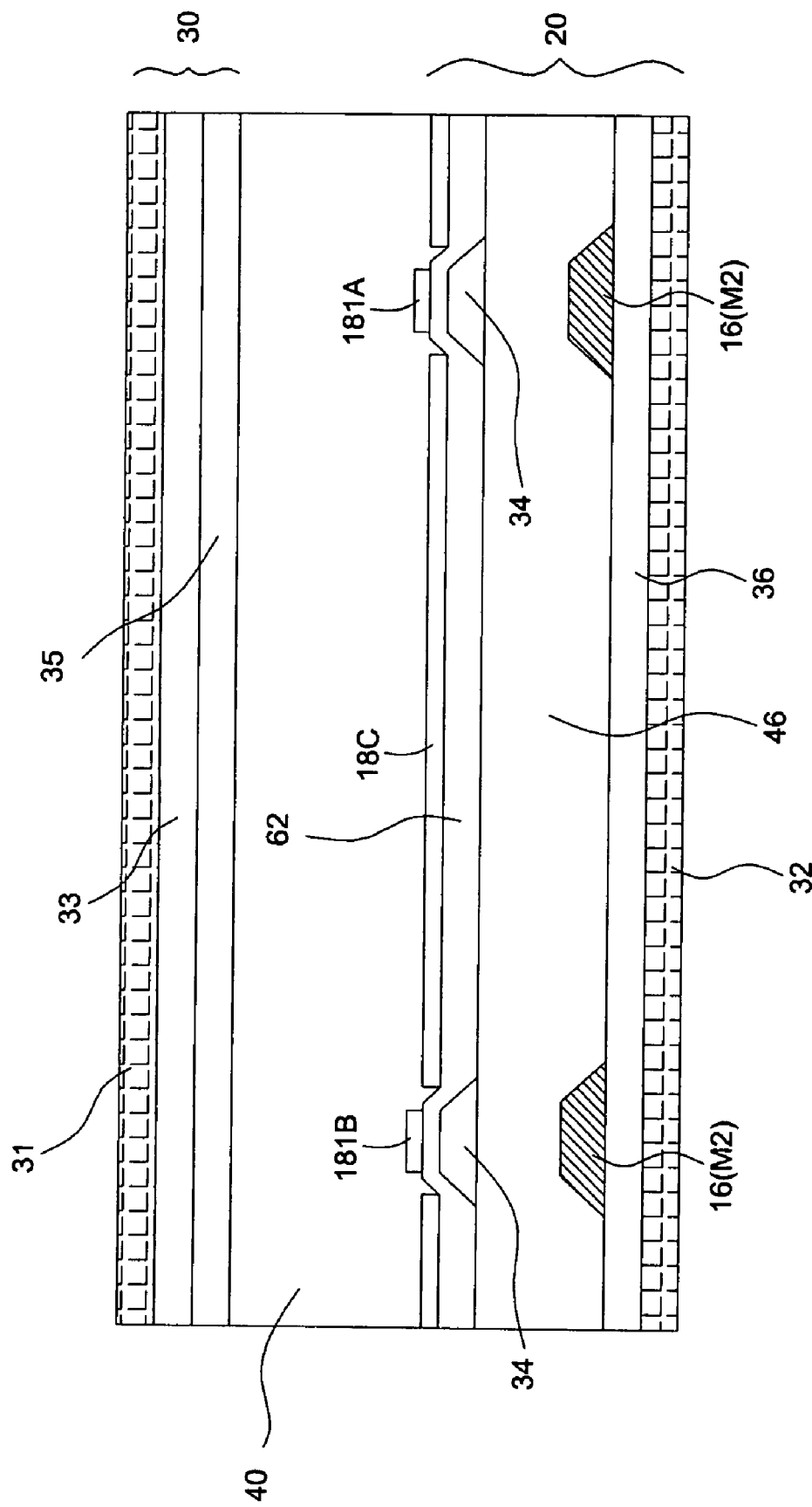
FIG. 9 shows a cross-sectional diagram illustrating another embodiment of the invention.

FIG. 9 shows a cross-sectional diagram illustrating another embodiment of the invention. As shown in FIG. 9, after the metal 2 layer M2 is formed on the gate insulation layer 36, only the flattened layer 46 is formed overlaying the metal 2 layer M2 before the formation of the common lines 34; that is, the passivation layer 44 shown in FIG. 5B can be omitted. Also, in this embodiment, the common lines 34 together with the extension parts of pixel electrodes form storage capacitors, and the common lines 34 are positioned overlapping the signal lines to further improve the pixel aperture ratio. Further, the common lines 34 may be made from metallic materials or transparent conductive materials.

While the invention has been described by way of examples and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A multi-domain liquid crystal display, comprising:
a plurality of first picture elements, each of the first picture elements having at least one first extension part; and
a plurality of second picture elements having an opposite polarity relative to the first picture elements under the same frame of an inversion drive scheme, each of the second picture elements having at least one second extension part;
wherein each first extension part is positioned next to at least one side of one second picture element, each second extension part is positioned next to at least one side of one first picture element, each picture element is provided with at least one slit that separates the picture element into a plurality of sub picture elements, and the extension part protruding from one picture element extends into the slit provided on the adjacent picture element.

2. The multi-domain liquid crystal display as claimed in claim 1, wherein the picture element is a red, a blue, or a green sub-pixel.

3. A multi-domain liquid crystal display, comprising:
a plurality of first picture elements; and
a plurality of second picture elements having an opposite polarity relative to the first picture elements under the same frame of an inversion drive scheme;
wherein a part of each first picture element at least partially surrounds one second picture element, a part of each second picture element at least partially surrounds one first picture element, and the parts of the first and second picture elements are provided in an inter-pixel region between two adjacent picture elements.

4. The multi-domain liquid crystal display as claimed in claim 3, wherein the parts of the picture elements provided in the inter-pixel region function as storage capacitors.

5. The multi-domain liquid crystal display as claimed in claim 4, wherein each picture element includes a plurality of scan lines and data lines, and the position of the storage capacitors overlap that of the scan lines or the data lines.

6. A multi-domain liquid crystal display, comprising:
a first and a second transparent substrates facing to each other;
a common electrode provided on the first transparent substrate;
a metal 1 layer formed on the second transparent substrate;
a first dielectric layer formed on the second transparent substrate and covering the metal 1 layer;
a metal 2 layer formed on the first dielectric layer;
a second dielectric layer formed on the first dielectric layer and covering the metal 2 layer;
a plurality of common lines formed on the second dielectric layer and electrically connected to the common electrode;
a third dielectric layer formed on the second dielectric layer and covering the common lines; and a plurality of first and second pixel electrodes alternately arranged on the third dielectric layer and having opposite polarities under the same frame of an inversion drive scheme;

wherein each first pixel electrode has at least one extension part positioned next to at least one side of the adjacent second pixel electrode, each second pixel electrode has at least one extension part positioned next to at least one side of the adjacent first pixel electrode, and the extension part of one pixel electrode separates the adjacent pixel electrode into a plurality of sections.

* * * * *